(12) United States Patent
Trabant et al.

(10) Patent No.: US 7,303,219 B2
(45) Date of Patent: Dec. 4, 2007

(54) INTERLOCKING BUMPER MOUNTING SYSTEM

(75) Inventors: Carl Trabant, Lake Oswego, OR (US); Justin Yee, Portland, OR (US); Steve Griffiths, Portland, OR (US)

(73) Assignee: Freightliner, LLC, Portland, OR (US)

( * ) Notice: Subject to any disclaimer, the term of this patent is extended or adjusted under 35 U.S.C. 154(b) by 0 days.

(21) Appl. No.: 11/245,777

(22) Filed: Oct. 6, 2005

(65) Prior Publication Data

US 2006/0125253 A1 Jun. 15, 2006

Related U.S. Application Data

(60) Provisional application No. 60/635,048, filed on Dec. 9, 2004.

(51) Int. Cl.
*B60R 19/18* (2006.01)
*B60R 19/04* (2006.01)

(52) U.S. Cl. ............... 293/155; 293/120; 293/132; 293/151; 293/152; 296/187.09; 296/187.1

(58) Field of Classification Search ............ 293/155, 293/154, 151, 132, 149, 152, 153, 120; 296/187.03, 296/187.09, 187.1, 187.11
See application file for complete search history.

(56) References Cited

U.S. PATENT DOCUMENTS

| | | | | |
|---|---|---|---|---|
| 2,954,256 A | * | 9/1960 | Barenyi | 293/136 |
| 4,130,312 A | * | 12/1978 | Cooper, Sr. | 293/153 |
| 4,402,537 A | | 9/1983 | Gallitzendörfer et al. | |
| 4,817,307 A | | 4/1989 | Hardgrove | |
| 4,875,728 A | * | 10/1989 | Copp et al. | 293/126 |
| 5,201,912 A | * | 4/1993 | Terada et al. | 293/120 |
| 5,290,078 A | | 3/1994 | Bayer et al. | |
| 5,984,389 A | | 11/1999 | Nuber et al. | |
| 6,042,163 A | * | 3/2000 | Reiffer | 293/155 |
| 6,174,009 B1 | * | 1/2001 | McKeon | 293/133 |
| 6,322,115 B1 | * | 11/2001 | Devilliers | 293/142 |
| 6,338,510 B1 | * | 1/2002 | Kanamori et al. | 293/154 |
| 6,554,333 B2 | * | 4/2003 | Shimotsu et al. | 293/132 |
| 6,609,740 B2 | | 8/2003 | Evans | |
| 6,669,252 B2 | | 12/2003 | Roussel et al. | |
| 6,695,368 B1 | * | 2/2004 | Weykamp et al. | 293/154 |
| 6,712,411 B2 | * | 3/2004 | Gotanda et al. | 293/155 |
| 6,729,681 B2 | * | 5/2004 | Yustick | 296/193.01 |
| 6,767,039 B2 | * | 7/2004 | Bird | 293/154 |
| 6,923,484 B2 | * | 8/2005 | Braun et al. | 293/155 |
| 6,926,327 B2 | * | 8/2005 | Shibata | 293/155 |
| 6,932,398 B2 | * | 8/2005 | Frank | 293/155 |

(Continued)

FOREIGN PATENT DOCUMENTS

EP 0343546 11/1989

*Primary Examiner*—D Glenn Dayoan
*Assistant Examiner*—Greg Blankenship
(74) *Attorney, Agent, or Firm*—Klarquist Sparkman LLP

(57) ABSTRACT

An exemplary interlocking bumper for mounting to frame rails of a vehicle is illustrated with a respective first bumper mounting receptacle coupled to each frame rail, such as by a frame rail mounting bracket. The interlocking bumper can further include a center bumper reinforcement that includes projections that are insertable into the first bumper mounting receptacles. Each projection of the center bumper reinforcement can define a second bumper mounting receptacle. Furthermore, the interlocking bumper can include first and second end cap bumper reinforcements each including a projection that is insertable into one of the second bumper mounting receptacles.

26 Claims, 10 Drawing Sheets

U.S. PATENT DOCUMENTS

| | | | |
|---|---|---|---|
| 6,942,262 B2 * | 9/2005 | Glasgow et al. | 293/132 |
| 6,959,950 B2 * | 11/2005 | Bladow et al. | 293/155 |
| 6,962,380 B2 * | 11/2005 | Lee | 293/155 |
| 7,004,519 B2 * | 2/2006 | Roussel et al. | 293/120 |
| 7,077,442 B2 * | 7/2006 | Arns | 293/155 |

\* cited by examiner

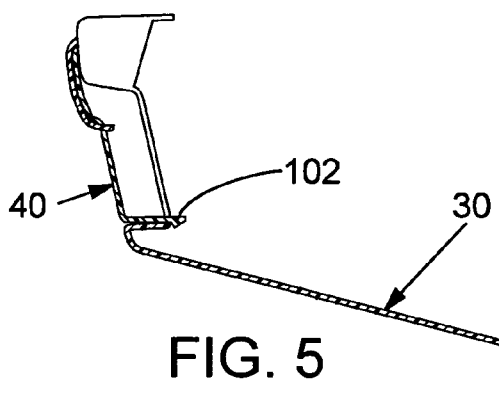
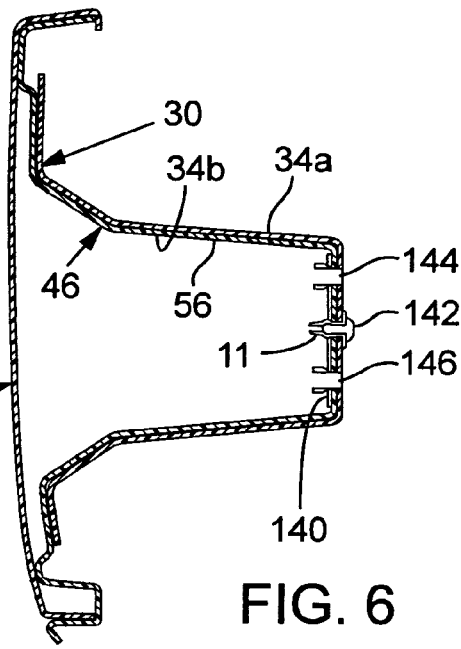
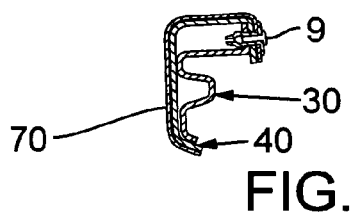
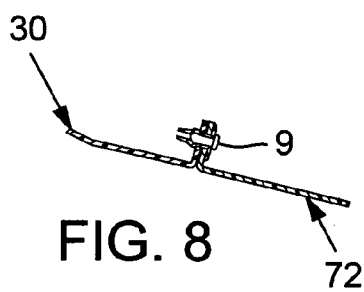
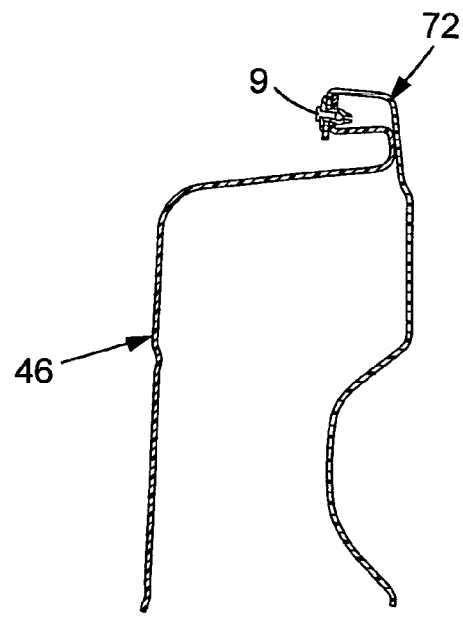

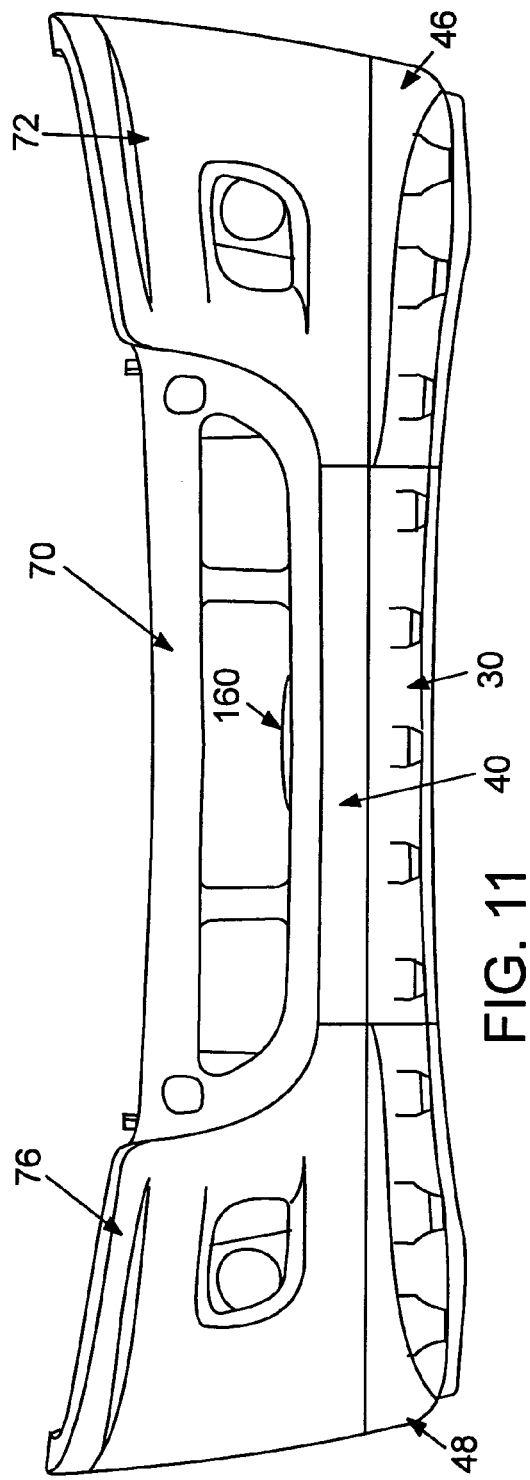
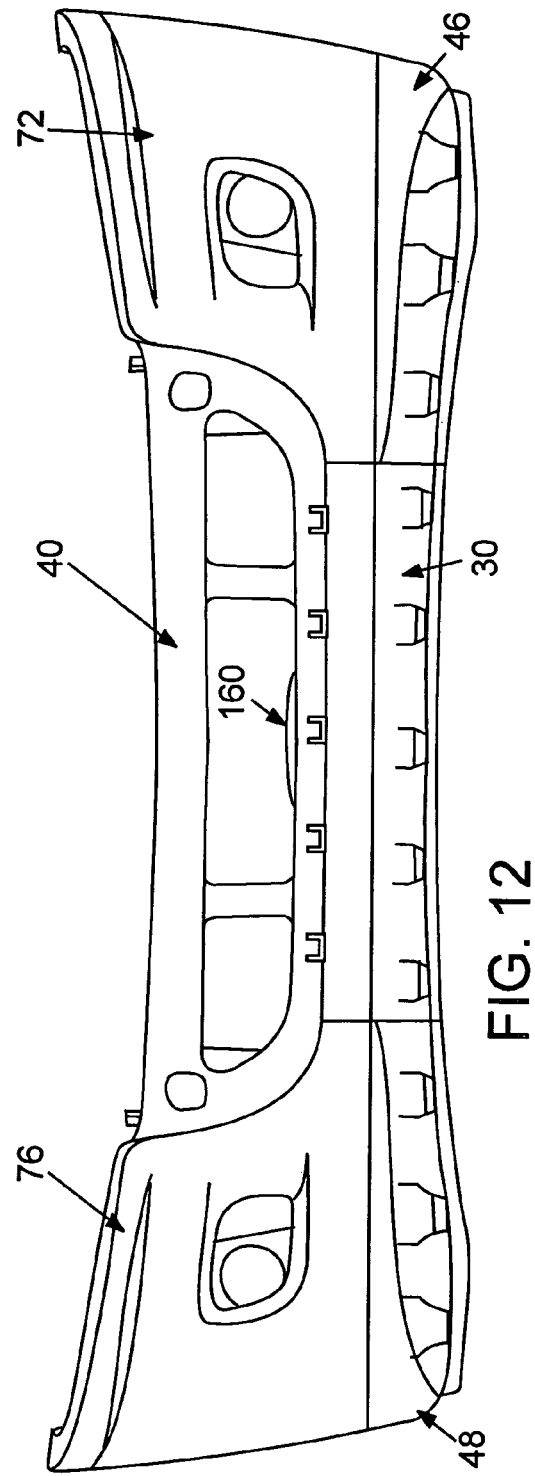

INTERLOCKING BUMPER MOUNTING SYSTEM

CROSS REFERENCE TO RELATED APPLICATION

This application claims the benefit of prior pending U.S. Provisional Patent Application No. 60/635,048, filed Dec. 9, 2004, which is herein incorporated by reference.

FIELD

The present application is directed toward a bumper system for a vehicle, more particularly an interlocking bumper mounting system for a vehicle.

BACKGROUND

Bumper assemblies for vehicles with multiple interconnected parts are known. The interconnectivity of the parts forming the bumper assemblies can often require complex and robust parts which can result in significant installation time and costs. Furthermore, supporting and aligning these parts can prove to be difficult and often requires post-assembly adjustments and modifications.

Therefore, a need exists for an improved bumper assembly.

SUMMARY

A desirable bumper assembly has a simple design and can be easily mounted to a vehicle. Also, a desirable form of a bumper assembly is self-positioning and self-aligning to reduce the need of post-mounting alignment correction.

Disclosed below are representative embodiments that are not intended to be limiting in any way. Instead, the present disclosure is directed toward novel and nonobvious features, aspects and equivalents of the embodiments of the interlocking bumper mounting system described below. The disclosed features and aspects of the embodiments can be used alone or in various novel and nonobvious combinations and sub-combinations with one another.

In accordance with one embodiment, a bumper is coupled to respective frame rails utilizing interfitting receptacles and projections. More specifically, in this embodiment, at least one of a first set of interfitting or nesting receptacles and projections is coupled to a first frame rail with the other of the interfitting or nesting receptacles and projections of the first set being coupled to the bumper. In addition, at least one of a second set of interfitting or nesting receptacles and projections is coupled to a second frame rail and the other of the second set of interfitting or nesting receptacles and projections is coupled to the bumper. The bumper is mounted by interfitting or nesting the first and second sets of interfitting projections and receptacles together and securing them. The bumper can comprise a plurality of components that are preassembled prior to interfitting the first and second sets of receptacles and projections together. The bumper can comprise intermediate components that desirably, but not necessarily include, nesting or interfitting projections and receptacles.

In another embodiment, a respective bumper mounting receptacle is coupled to each frame rail of a vehicle. A bumper comprises mounting projections that are each insertable into a respective mounting receptacle for mounting to the frame rails via the receptacles. The bumper desirably comprises a plurality of components that can be preassembled prior to mounting to the receptacles. The bumper components can include one or more intermediate components defining associated projections and receptacles that nest together when the bumper is preassembled.

In one embodiment, an interlocking bumper for mounting to frame rails of a vehicle desirably comprises a respective first bumper mounting receptacle coupled to each frame rail, such as by respective frame rail mounting brackets. In this disclosure, the term coupling broadly includes both direct connection of two components, and indirect connection through one or more other components. The interlocking bumper further can comprise a center bumper reinforcement comprising projections insertable into the first bumper mounting receptacles with each projection defining a second bumper mounting receptacle. Furthermore, the bumper desirably can comprise first and second end cap bumper reinforcements each comprising a projection that is insertable into an associated one of the second bumper mounting receptacles. In some implementations, the projections of the center bumper reinforcement and the frame rail mounting receptacles can be configured for nested engagement. Also, the projections of the first and second end cap bumper reinforcements and the second bumper mounting receptacles of the center bumper reinforcement can be configured for nested engagement. Furthermore, in some implementations, the frame rail mounting brackets can comprise a center bumper reinforcement engaging portion that is configured to couple the frame rail mounting brackets to the center bumper reinforcement.

In some implementations of the interlocking bumper, the center bumper reinforcement comprises respective end portions that are securable to respective portions of the first and second end cap reinforcements. For example, end portions of the center bumper reinforcement can extend beyond corresponding portions of the end cap reinforcements, such as by underlying or overlying the same, for fastening together. Alternatively, the center reinforcement can comprise end portion flange portions that respectively abut flange portions of the first and second end cap reinforcements for fastening together at the flange portions.

In some implementations of the interlocking bumper, the first bumper mounting receptacles, the projections of the center bumper reinforcement, the second bumper mounting receptacles and the projections of the first and second end cap bumper reinforcements can comprise a shape that is generally elongated in the height direction. In certain implementations, the shape is a generally frustum shape. In other implementations, the sides of these components may comprise projection ridges.

In some implementations, the center bumper reinforcement of the interlocking bumper can comprise a step. A center fascia configured to be mounted to the center bumper reinforcement can comprise a notched portion that is configured to accommodate the step of the center bumper. Furthermore, trim that is configured to be mounted to the center fascia can also comprise a notched portion configured to accommodate the step of the center bumper reinforcement. The center fascia and the center bumper reinforcement can be snap-fit or otherwise secured together.

In several implementations, the interlocking bumper can comprise end cap bumper fascias each coupled to one of the first and second end cap bumper reinforcements. The end cap bumper fascias can be configured to overlay the respective end cap bumper reinforcements with these components desirably snap-fit or otherwise secured together. A portion of each of the end cap bumper fascias can also overlay and be mounted to a portion of the center bumper reinforcement.

The portions of the end cap bumper fascias overlying the center bumper reinforcement and the center bumper reinforcement can be snap-fit or otherwise secured together.

The first bumper mounting receptacle, the center bumper reinforcement, each of the first and second end cap bumper reinforcements, the center fascia, the trim and each of the end cap bumper fascias can, for example, be made of a one-piece monolithic construction such as comprising a plastic material with a specific example being glass fiber reinforced plastic.

In one embodiment, an interlocking bumper for mounting to frame rails of a vehicle comprises respective first bumper projections that are desirably each coupled to a respective associated frame rail, such as by a frame rail mounting bracket. The interlocking bumper desirably comprises a center bumper reinforcement comprising projections, where each projection defines a first bumper mounting receptacle that is configured to receive a respective one of the first bumper projections. Furthermore, the interlocking bumper desirably comprises first and second end cap bumper reinforcements each desirably comprising a second bumper mounting receptacle that can be configured to receive the projections of the center bumper reinforcement.

A method of mounting an interlocking bumper to frame rails of a vehicle is also disclosed. In one embodiment, the method comprises coupling a respective first bumper mounting receptacle to each frame rail mounting bracket. The method can further comprise inserting respective projections of a bumper, such as formed in a center bumper reinforcement, into each of the first bumper mounting receptacles with each projection defining a second bumper mounting receptacle. Additionally, the method can also comprise inserting a projection formed in a first end cap bumper reinforcement and a projection formed in a second end cap bumper reinforcement into respective second bumper mounting receptacles.

In some implementations, inserting the projection formed in the first end cap bumper reinforcement and the projection formed in the second end cap bumper reinforcement into the respective second bumper mounting receptacles can occur prior to inserting the respective projections formed in the center bumper reinforcement into each of the first bumper mounting receptacles.

In other implementations, the method can comprise attaching a front fascia to the center bumper reinforcement. The method can further comprise attaching a trim portion to the front fascia. Attaching the trim portion to the front fascia and attaching the front fascia to the center bumper reinforcement can occur prior to inserting the respective projections formed in the center bumper reinforcement into each of the first bumper mounting receptacles.

In some implementations, the method can comprise attaching a first end cap fascia to the first end cap bumper reinforcement and a second end cap fascia to the second end cap bumper reinforcement. Furthermore, attaching the first end cap fascia to the first end cap bumper reinforcement and the second end cap fascia to the second end cap bumper reinforcement can occur prior to inserting the respective projections formed in the center bumper reinforcement into each of the first bumper mounting receptacles.

In one embodiment, a bumper for mounting to frame rails of a vehicle comprises respective first bumper elements that has a first nesting portion coupled to the frame rails. The first bumper elements can be offset from the frame rails. The bumper also comprises a second bumper element that has respective second nesting portions configured to nestably engage the first nesting elements to couple the second bumper element to the frame rails.

In one embodiment, a method of mounting a bumper to frame rails of a vehicle comprises coupling respective first bumper elements that comprise a first nesting portion to the frame rails. The method further includes nestably engaging second nesting portions of a second bumper element with the first nesting portions of the respective first bumper elements to couple the second bumper element to the frame rails.

The foregoing and other objects, features, and advantages of the invention will become more apparent from the following detailed description, which proceeds with reference to the accompanying figures.

BRIEF DESCRIPTION OF THE DRAWINGS

FIG. 5 is a vertical sectional view of the center bumper reinforcement and a center fascia of the interlocking bumper embodiment of FIG. 4 taken along the line 5-5 of FIG. 4.

FIG. 6 is a vertical sectional view of an end cap fascia, a center bumper reinforcement and the center fascia of the interlocking bumper embodiment of FIG. 3 taken along the line 6-6 of FIG. 3.

FIG. 7 is a vertical sectional view of the center bumper reinforcement, the center fascia and a trim piece of the interlocking bumper embodiment of FIG. 4 taken along the line 7-7 of FIG. 4.

FIG. 8 is a sectional front view of a portion of the center bumper reinforcement and end cap bumper reinforcement of the interlocking bumper embodiment of FIG. 3 taken along the line 8-8 of FIG. 3.

FIG. 9 is a vertical sectional view of portions of an end cap bumper reinforcement and an end cap fascia of the interlocking bumper embodiment of FIG. 3 taken along the line 9-9 of FIG. 3.

FIG. 11 is a front elevational view of another embodiment of the interlocking bumper when the bumper is assembled.

FIG. 12 is a front elevational view of the interlocking bumper embodiment of FIG. 11 when assembled and with an exemplary trim piece removed.

DETAILED DESCRIPTION

Figure 1:
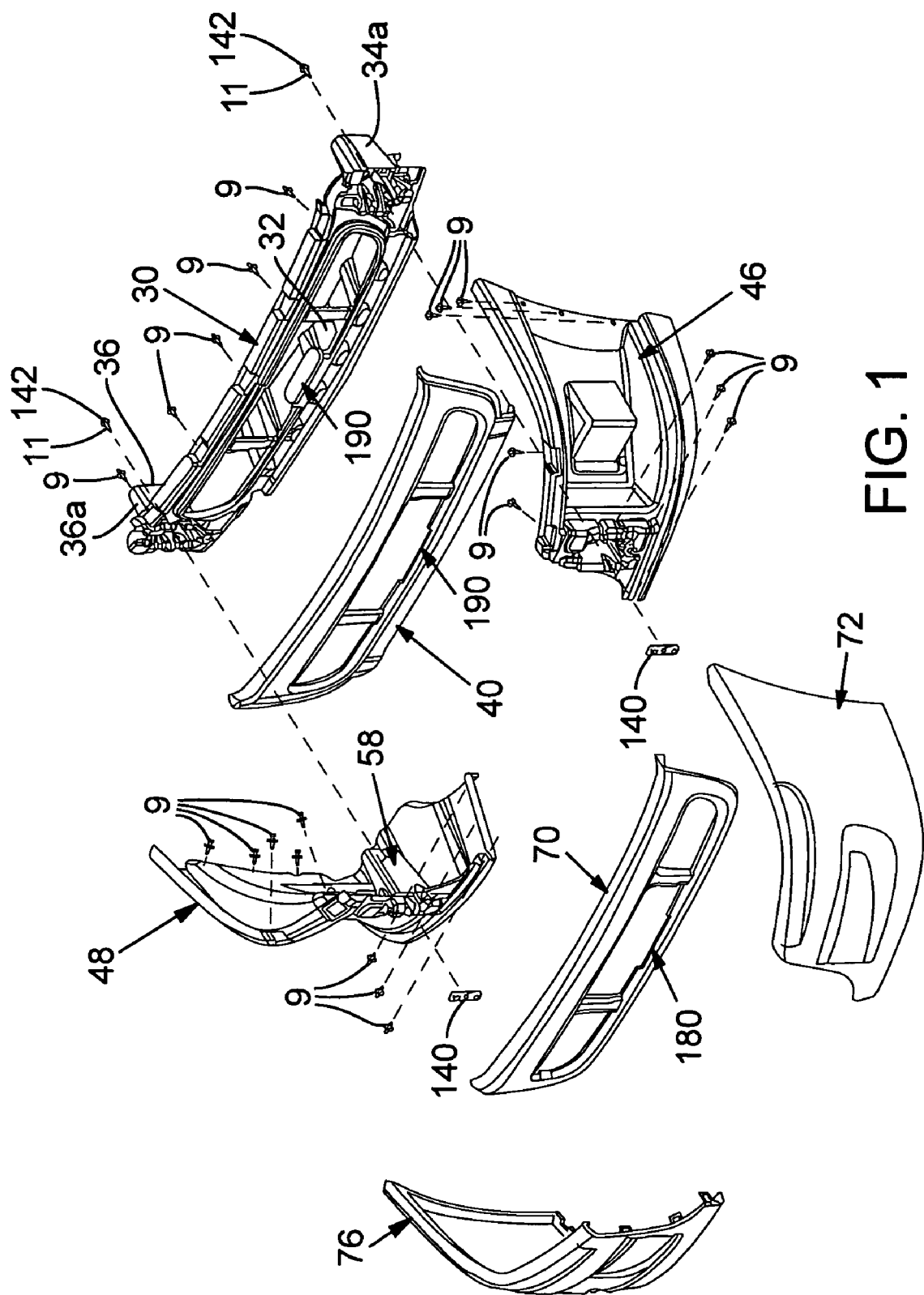
FIG. 1 is an exploded view of an embodiment of one exemplary form of an interlocking bumper of the present application.

An exemplary interlocking bumper is shown in FIGS. 1-10. Several exemplary components of the bumper embodiments of FIGS. 1-10 are listed in Table 1 below.

TABLE 1

| Component | Reference No. |
| --- | --- |
| Snap-fit Fastener | 9 |
| Washer | 11 |
| Center Reinforcement | 30 |
| Left Hand (LH) Center Reinforcement Projection/Receptacle | 34a/34b |
| Right Hand (RH) Center Reinforcement Projection/Receptacle | 36a/36b |
| Front Fascia | 40 |
| LH End Cap Reinforcement | 46 |
| RH End Cap Reinforcement | 48 |
| RH End Cap Reinforcement Projection | 58 |
| Trim Piece | 70 |
| LH End Cap Fascia | 72 |
| RH End Cap Fascia | 76 |
| Nut Plate | 140 |
| Fastener | 142 |
| Trim Piece Notch | 180 |
| Front Fascia Notch | 190 |

These components comprise an interlocking bumper sub-assembly 10 having a center reinforcement or support 30 that comprises an air dam portion along the lower edge thereof. Center reinforcement 30 also comprises respective first and second projections 34a,36a defining first and second projection receiving receptacles 34b, 36b. A center fascia 40 can be mounted to the front of support 30. First and second bumper end cap supports or reinforcements 46,48 are provided and are coupled to the center reinforcement 30 to provide a reinforced structure for the bumper. Bumper end cap reinforcement 46 comprises a rearwardly extending projection 56 (FIG. 2) sized for at least partial insertion into the receptacle 34b of the center reinforcement 30. Bumper end cap reinforcement 48 comprises a projection 58 sized for at least partial insertion into the receptacle 36b of center reinforcement 30. This interfitting or nested projection and receptacle construction reinforces the overall bumper assembly. A trim piece 70, which may be chrome-plated, is mounted to fascia 40. Respective first and second end cap fascias 72, 76 are mounted to overlay reinforcements 46 and 48.

Although the end cap reinforcements 46,48 are shown as being separate components, it is recognized that the end cap reinforcements can be a single monolithic component having the same or similar features as the separate components described herein.

Figure 10:
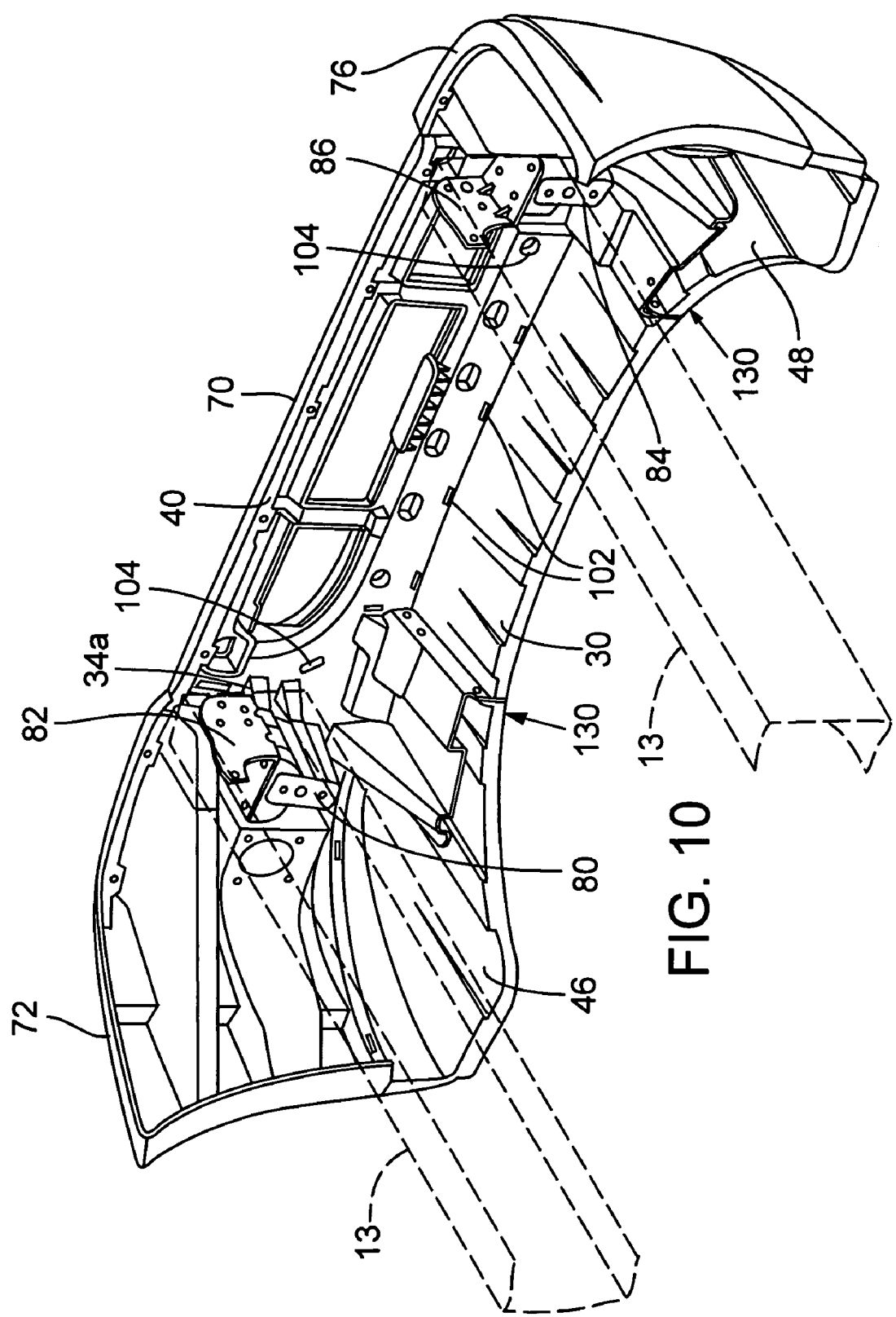
FIG. 10 is a perspective view of the interlocking bumper embodiment of FIG. 1 when the bumper is assembled and coupled to frame rails (frame rails or frame rail extensions being shown in dashed lines in these figures and the rest of the vehicle being omitted for convenience).
Figure 13:
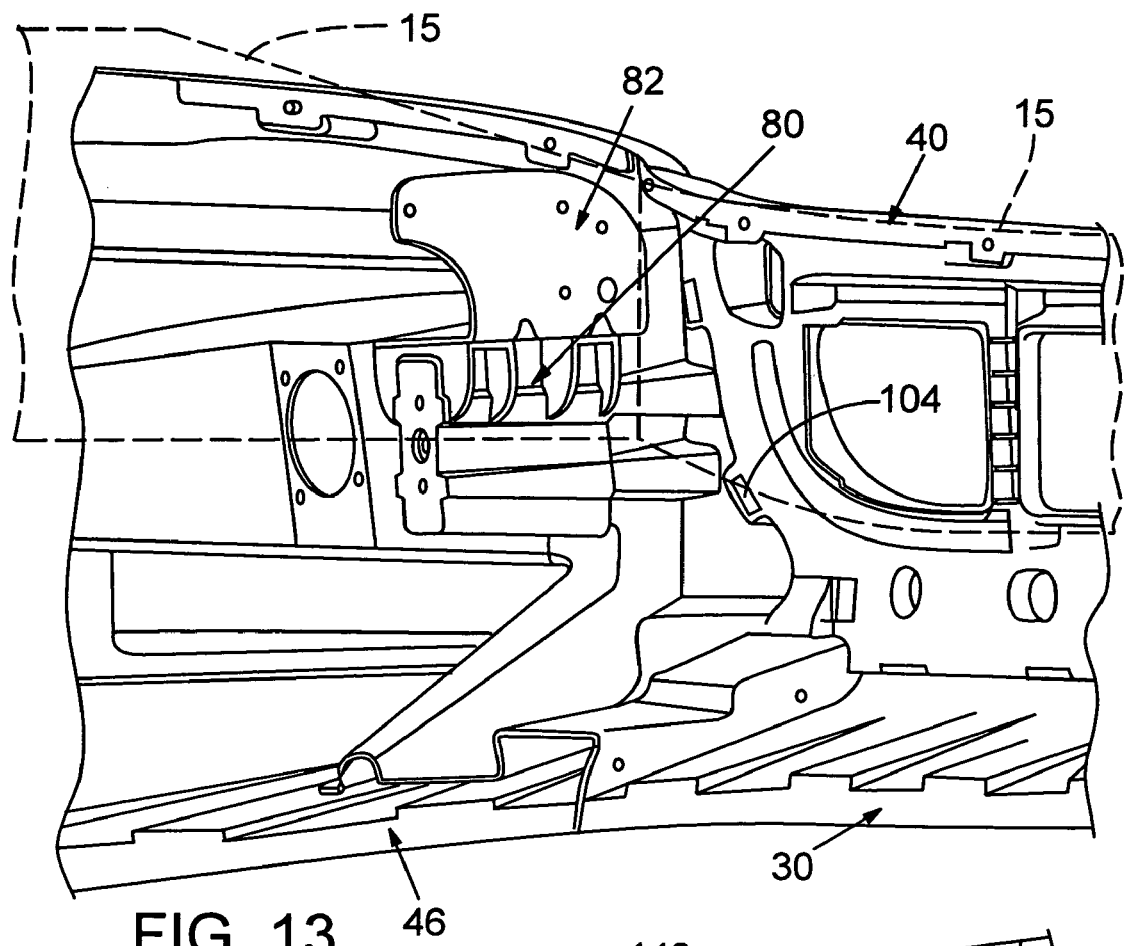
FIG. 13 is a perspective view of a portion of the interlocking bumper embodiment of FIG. 11 when coupled to a frame rail (a portion of a frame rail, in this example, is a frame rail extension being shown in dashed lines in this figure).
Figure 14:
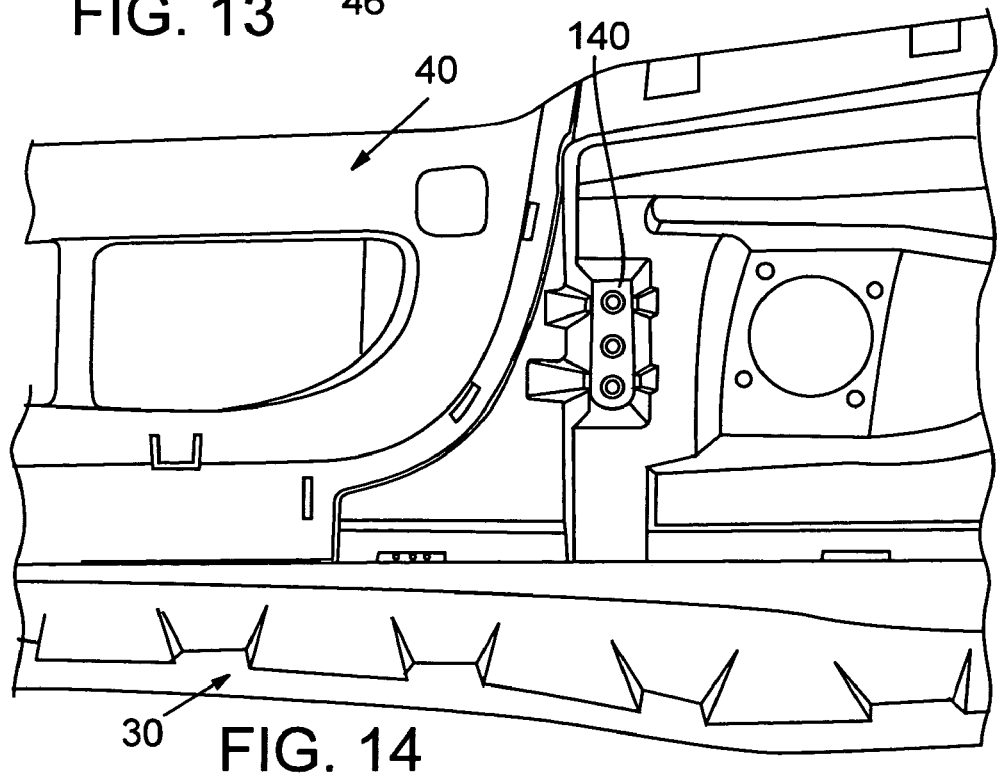
FIG. 14 is a close-up front elevational view of a portion of the interlocking bumper embodiment of FIG. 11 when the bumper is assembled and prior to coupling to a frame rail.

As best seen in FIG. 10, a first frame rail coupling receptacle 80 is provided and is coupled to an end portion of a first frame rail 13a of the vehicle such as via a frame rail mounting bracket 82. A second frame rail receptacle 84 is coupled to a second frame rail 13b, such as via a second frame rail mounting bracket 86. The frame rail receptacles 80,84 receive the respective projections 34a,36a to at least partially support the bumper sub-assembly 10 when preassembled, or center reinforcement 30 when the bumper sub-assembly is not preassembled, as the respective components are mounted in place. In this way, the interlocking projections and receptacles locate the end cap reinforcements 46,48 and the end cap fascias 72,76 to facilitate a properly assembled and positioned bumper.

Figure 17:
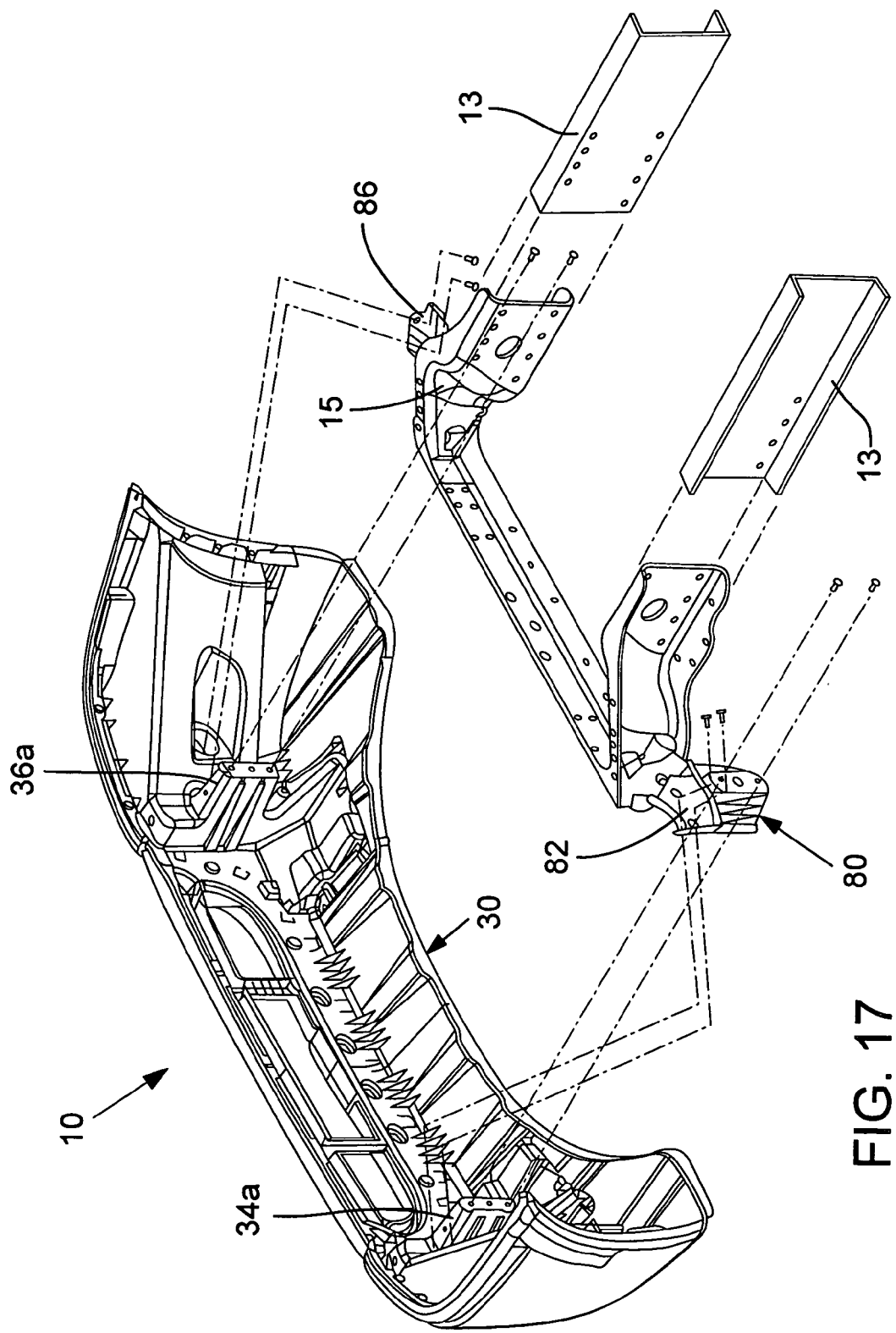
FIG. 17 is an exploded view of an assembled bumper, a frame rail extension, and a first and second frame rails to illustrate an exemplary approach for coupling the assembled bumper to the frame rails.

In some embodiments, as shown in FIG. 17, the bumper system can include a frame rail extension 15 coupling the front ends of the frame rails 13a,13b. The frame rail receptacles 80,84 can be directly mounted to the frame rail extension 15 or coupled to the extension via an intermediate component, such as mounting brackets 82,86, respectively. The frame rail extension 15 can be configured such that the frame rail receptacles 80,84 are offset from a longitudinal axis of the frame rails 13a,13b, respectively. For example, the frame rail receptacles 80,84 can be offset by being positioned lower than and/or laterally away from a side of the frame rails 13a,13b, respectively.

As also can be seen in FIG. 10, various components may be, for example, snap-fit together. In some implementations, a snap-fit portion, such as snap-fit tab 102, can project rearwardly from center fascia 40 and be inserted into a snap-fit receiving receptacle or slot in the center reinforcement 30. A plurality of such snap-fit portions and receptacles are provided in the illustrated construction. Similarly, plural snap-fit portions, for example, tabs 104, projecting from the end cap fascia components may be inserted into receiving slots in the center reinforcement 30 to assist in the interconnection of these components.

In some embodiments, fasteners, such as screws, or alternative interfitting assembly arrangements, may be used instead of, or in addition to, snap-fit portions and receptacles.

As can be seen in FIG. 10, a portion of the center reinforcement overlaps a portion of the first end cap reinforcement 46 and a portion of the center reinforcement also overlaps a portion of the second end cap reinforcement 48. In addition, these respective components can have abutting flange portions (indicated generally at 130,132) in FIG. 10 that may be fastened together to further reinforce the construction. Alternatively, other forms of joints may also be used.

With specific reference to FIG. 6, a central opening 141 is provided through receptacle 34, projection 56 and a nut plate 140. A fastener is inserted through this central opening, the fastener being indicated at 142 in FIGS. 1 and 6. This holds the sub-assembled bumper components together. Upper and lower openings 144,146 are aligned with corresponding openings 150,152 in receptacle 80 (FIG. 2) when the bumper sub-assembly is mounted to the receptacle. As a result, fasteners may be inserted through these aligned openings to mount the assembled bumper sub-assembly in place onto the frame rails 13a,13b. The enlarged central opening 154 in receptacle 80 (see FIG. 2) provides clearance for the head of fastener 142 so that the receptacle 34 may be inserted into the base of the receptacle 80 during the mounting of the bumper sub-assembly to the vehicle frame rails 13a,13b.

In the illustrated embodiments, the shape of the projections and corresponding receptacles is elongated in the height direction with a diminishing cross-sectional area along a longitudinal axis of the projections and receptacles from its base to its top, such as to form a generally frustum shape. It has been found that configuring the projections and receptacles in this manner provide enhanced vertical stiffness. Projecting ridges on the sides of the illustrated receptacles and projections are optional, but can add reinforcement to the receptacles. Although a desirable construction has receptacles that totally surround and receive an inserted projection, a receptacle is not required to have this construction and thus, for example, may only partially surround a projection.

Projections and receptacles of other shapes may be used while still achieving the benefits of the nested interlocking receptacles and projections as described herein.

Figure 18:
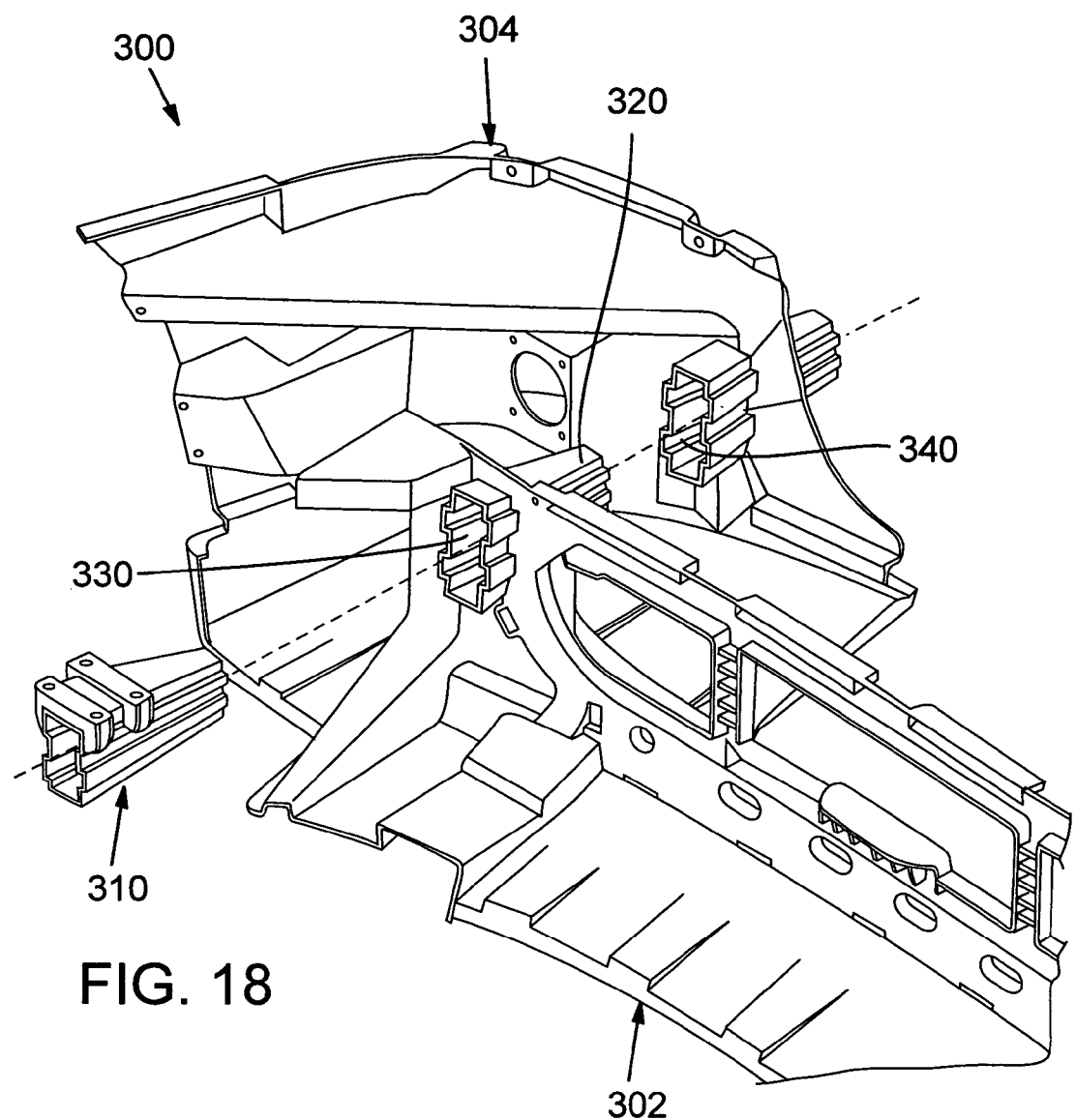
FIG. 18 is an exploded view of a portion of another embodiment of one exemplary form of the interlocking bumper.

In some embodiments, as shown in FIG. 18, the receptacles and projections illustrated in FIGS. 1-17 can be reversed. For example, in bumper 300, the rail receptacle 80 can be replaced with rail projection 310, and the center reinforcement receptacle 34b can be replaced with center reinforcement projections 320 defining receptacles 330. Further, the end cap projection 56 can be replaced with end cap receptacle 340.

The bumper 300 can be assembled, for example, by inserting center reinforcement projection 320 at least partially into end cap receptacle 340 to couple the center reinforcement 302 to the end cap reinforcement 304. The center reinforcement 302 can then be positioned such that the rail projection 310 is positioned at least partially within the center reinforcement receptacle 330 to couple the center reinforcement and the end cap reinforcement 304 to the rail projection 310 and thus the rail.

The fascia components can be painted separately and then installed into the bumper sub-assembly 10, thereby eliminating a painting step during vehicle manufacture. Also, the fascias can be molded in with desired colors to eliminate painting.

Figure 2:
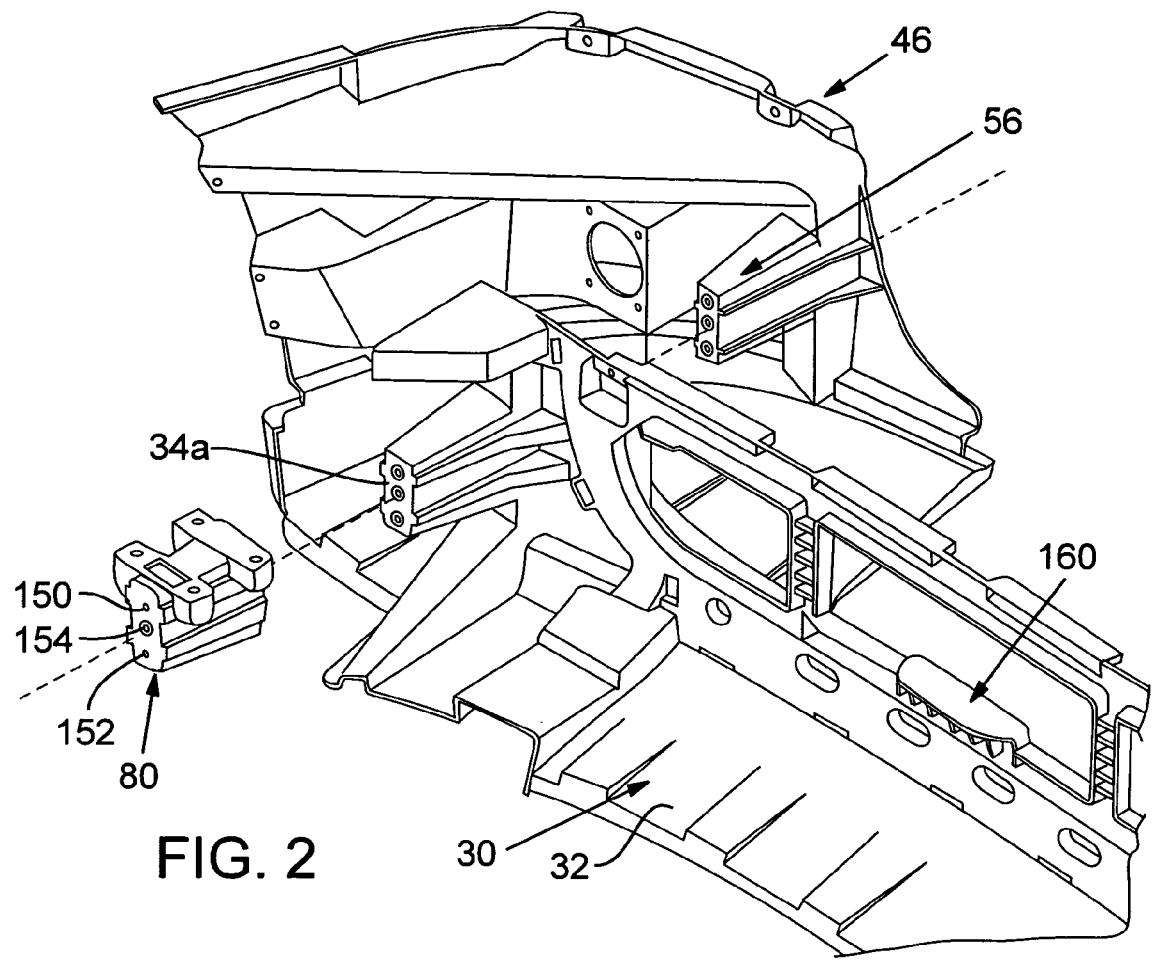
FIG. 2 is a partially broken away and partially exploded view of a center bumper reinforcement, an end cap bumper reinforcement and a frame rail receptacle of the interlocking bumper embodiment of FIG. 1.
Figure 3:
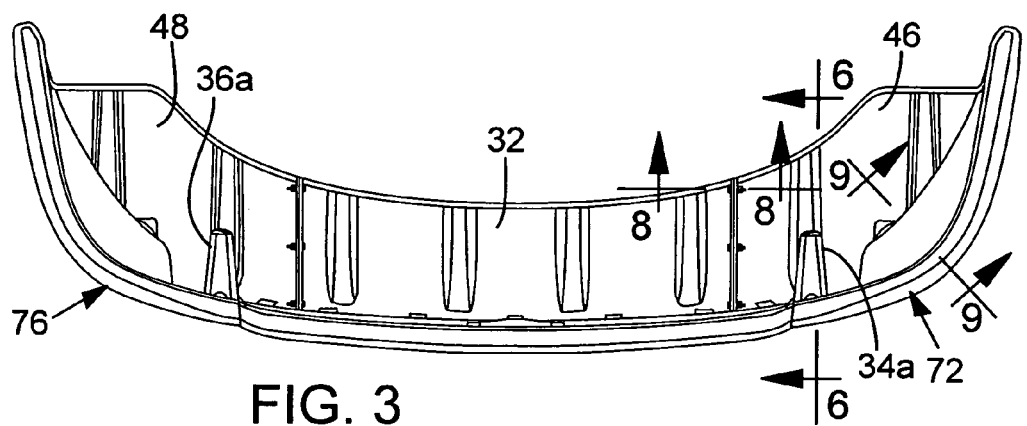
FIG. 3 is a top view of the interlocking bumper embodiment of FIG. 1 when assembled.
Figure 4:
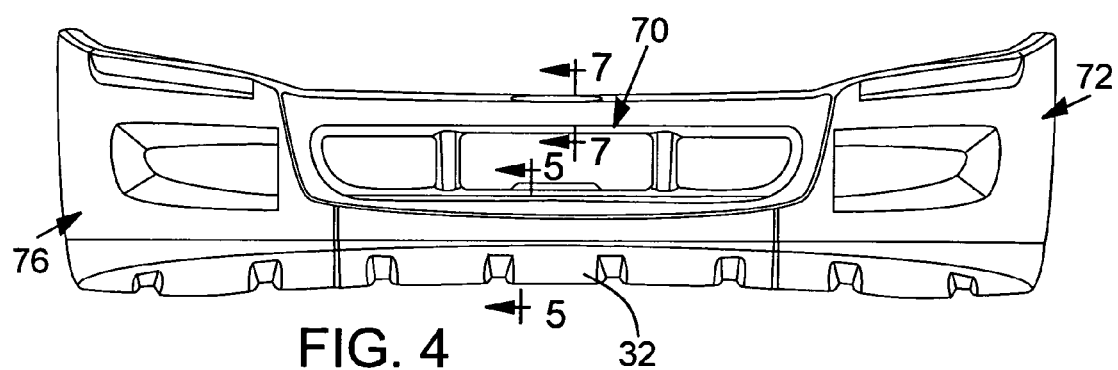
FIG. 4 is a front view of the interlocking bumper embodiment of FIG. 1 when the bumper is assembled.

With reference to FIG. 2, desirably a step 160 may be integrated (e.g., molded into) the center reinforcement 30. The trim piece 70 and front fascia 40 may be notched (e.g., at 180,190, respectively, in FIG. 1) to accommodate the step 160 which, for example, is shown in FIGS. 1, 2 and 11.

Desirably, each of the components 30, 40, 46, 48, 70, 72 and 76 are of a monolithic integral single piece construction, such as by being injection molded, and made entirely of plastic. However, in some embodiments, one or more of the components can be comprised a construction having two or more coupled pieces. The reinforcing (non-fascia) components are desirably made of glass fiber reinforced plastic such as polypropylene.

Figure 15:
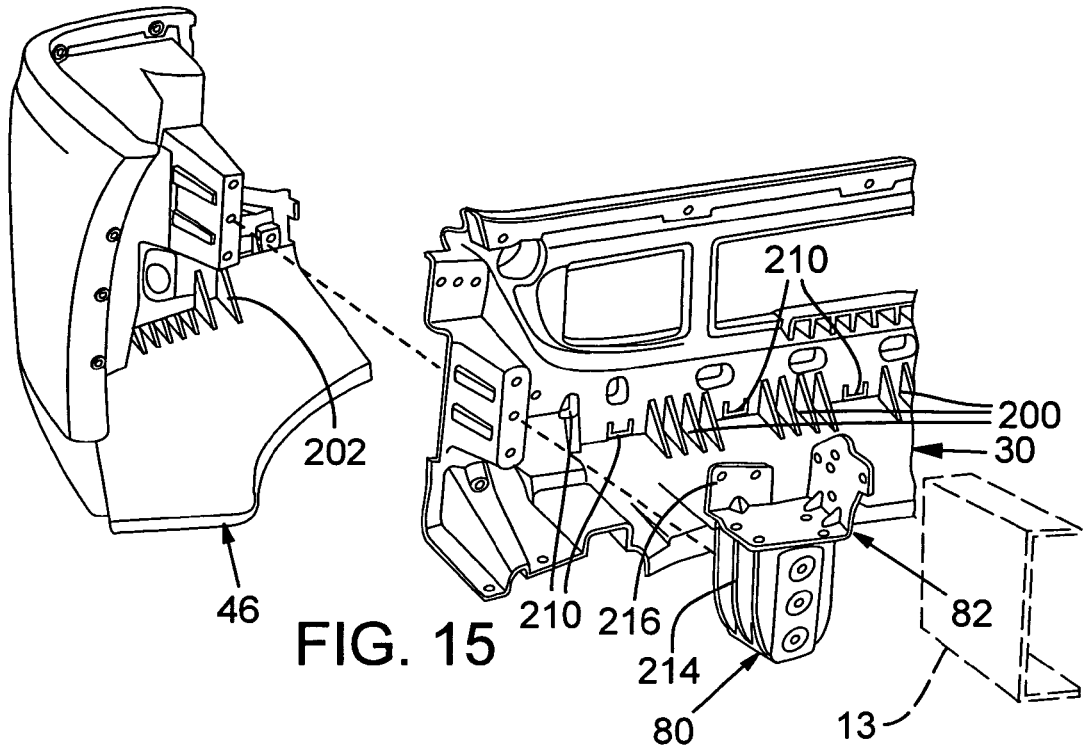
FIG. 15 is an exploded view of a portion of another embodiment of one exemplary form of the interlocking bumper.
Figure 16:
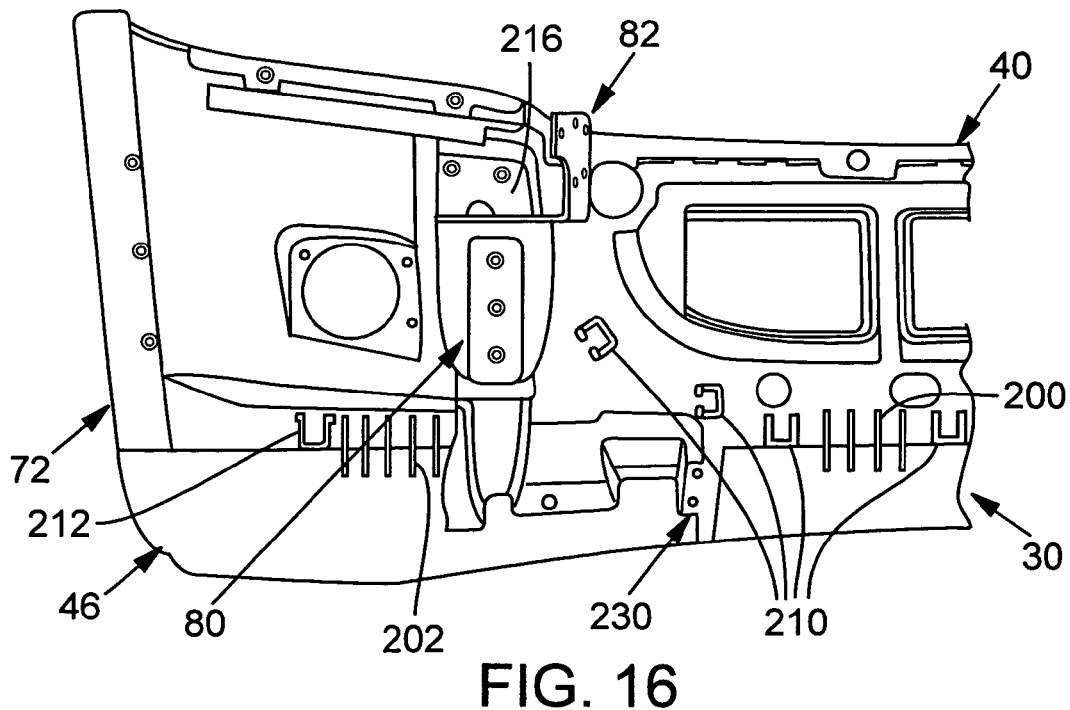
FIG. 16 is a rear elevational view of a portion of the interlocking bumper embodiment of FIG. 15 when assembled, but with frame rail components removed for convenience.

Another exemplary bumper system is shown in FIGS. 15 and 16. The bumper system of FIGS. 15 and 16 is similar to the bumper system shown in FIGS. 1-14 except for at least the several differences hereinafter described.

The bumper system of FIGS. 15 and 16 comprises structural support fins 200,202 formed in the center bumper reinforcement 30 and the end cap bumper reinforcement 46 for enhanced structural support of the bumper system. The fins 200,202 project generally outwardly from corners and portions of the corresponding contiguous intersecting surfaces of the center bumper reinforcement 30 and the end cap bumper reinforcement 46 to provide reinforcement of these components.

The components of the bumper system of FIGS. 15 and 16 can be interconnected using fasteners, such as snap-fit features 210,212. The snap-fit features 210,212 comprise a generally U-shaped slot defining a flap formed in a first component and a tab formed in a second component configured to extend through the slot and engage the flap formed in the first component such that the first and second components are interconnected. Further, as shown in FIG. 16, the center bumper reinforcement 30 and the end cap bumper reinforcement 46 can have overlapping flange portions, indicated generally at 230, as opposed to the abutting flange portions as was shown in FIG. 8. The overlapping flange portions may be fastened together to further reinforce the interconnectivity of the respective components.

The frame rail mounting bracket 82 of the bumper system shown in FIGS. 15 and 16 comprises center bumper reinforcement coupling tabs 216 for fastening to the center bumper reinforcement 30 to further reinforce the interlocking bumper system construction.

The frame rail coupling receptacle 80 of the bumper system illustrated in FIGS. 15 and 16 can comprise vertically extending fins 214 extending a substantial portion of the elongated sides of the receptacles 80 for further structural reinforcement of the receptacle and thus the bumper construction.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. An interlocking bumper for mounting to frame rails of a vehicle comprising:

respective spaced apart first bumper mounting receptacles for coupling to the frame rails, each first bumper mounting receptacle defining a first projection receiving space;

a center bumper reinforcement comprising spaced apart first projections comprising first insertion portions insertable into and nestably engageable within the first projection receiving spaces of the first bumper mounting receptacles, wherein each first insertion portion defines a second projection receiving space positionable within the first projection receiving space; and an end cap bumper reinforcement comprising spaced apart second projections comprising second insertion portions insertable into and nestably engageable within the second projection receiving spaces;

wherein the spaced apart second insertion portions of the end cap bumper reinforcement are insertable within the first projection receiving spaces when the first insertion portions are inserted in the first projection receiving spaces.

2. The interlocking bumper of claim 1, wherein the end cap bumper reinforcement comprises first and second spaced apart end cap bumper reinforcements each comprising one of the projections.

3. The interlocking bumper of claim 1, further comprising at least one end cap bumper fascia mounted to the end cap bumper reinforcement and configured to overlay the end cap bumper reinforcement.

4. The interlocking bumper of claim 1, further comprising a first frame rail mounting bracket coupled to one of the first bumper mounting receptacles for coupling one of said first bumper mounting receptacles to a first vehicle frame rail and a second frame rail mounting bracket coupled to another of the first bumper mounting receptacles for coupling another of said first bumper mounting receptacles to a second vehicle frame rail spaced from the first vehicle frame rail.

5. The interlocking bumper of claim 1, wherein a respective portion of the center reinforcement overlaps a portion of the end cap reinforcement.

6. The interlocking bumper of claim 5, wherein the portion of the center reinforcement overlapping the end cap reinforcement is securable to the end cap reinforcement.

7. The interlocking bumper of claim 1, wherein the center reinforcement comprises a first flange portion abutting a first flange portion of the end cap reinforcement and the center reinforcement comprises a second flange portion abutting a second flange portion of the end cap reinforcement, and wherein the abutting flange portions are configured to be fastened together.

8. The interlocking bumper of claim 3, wherein the end cap bumper reinforcement comprises first and second spaced apart end cap bumper reinforcements each comprising one of the second projections, and wherein each of the first bumper mounting receptacles, the center bumper reinforcement, the first and second end cap bumper reinforcements, and the at least one end cap bumper fascia are respectively of a one-piece monolithic construction comprised of a plastic material.

9. The interlocking bumper of claim 1, further comprising a frame rail extension adapted to couple the frame rails together, wherein the first bumper mounting receptacles are coupled to the frame rails by the frame rail extension.

10. The interlocking bumper of claim 1, wherein the first bumper mounting receptacles are offset from the frame rails.

11. The interlocking bumper of claim 1, wherein the interlocking bumper is peg-free.

12. An interlocking bumper for mounting to frame rails of a vehicle comprising:
respective spaced apart first bumper mounting receptacles coupled to the frame rails;
a center bumper reinforcement comprising spaced apart projections insertable into and nestably engageable with the first bumper mounting receptacles, wherein each projection defines a second bumper mounting receptacle; and
an end cap bumper reinforcement comprising spaced apart projections insertable into and nestably engageable with the second bumper mounting receptacles;
wherein the first bumper mounting receptacles, the projections of the center bumper reinforcement, the second bumper mounting receptacles and the projections of the end cap bumper reinforcement comprise a shape that is elongated in the height direction.

13. An interlocking bumper for mounting to frame rails of a vehicle comprising:
respective spaced apart first bumper mounting receptacles coupled to the frame rails;
a center bumper reinforcement comprising spaced apart projections insertable into and nestably engageable with the first bumper mounting receptacles, wherein each projection defines a second bumper mounting receptacle; and
an end cap bumper reinforcement comprising spaced apart projections insertable into and nestably engageable with the second bumper mounting receptacles;
wherein the first bumper mounting receptacles, the projections of the center bumper reinforcement, the second bumper mounting receptacles and the projections of the end cap bumper reinforcement comprise a frustum shape.

14. An interlocking bumper for mounting to frame rails of a vehicle comprising:
respective spaced apart first bumper mounting receptacles coupled to the frame rails;
a center bumper reinforcement comprising spaced apart projections insertable into and nestably engageable with the first bumper mounting receptacles, wherein each projection defines a second bumper mounting receptacle; and
an end cap bumper reinforcement comprising spaced apart projections insertable into and nestably engageable with the second bumper mounting receptacles;
wherein the sides of the first bumper mounting receptacles, the projections of the center bumper reinforcement, the second bumper mounting receptacles and the projections of the end cap bumper reinforcement comprise corresponding projecting ridges.

15. A method of mounting an interlocking bumper to frame rails of a vehicle comprising:
coupling respective first bumper mounting receptacles to the frame rails;
inserting respective projections formed in a center bumper reinforcement into each of the first bumper mounting receptacles, wherein each projection defines a second bumper mounting receptacle having at least a portion positioned within the first bumper mounting receptacle when the projections are inserted in the first bumper mounting receptacles; and
inserting a projection formed in a first end cap bumper reinforcement and a projection formed in a second end cap bumper reinforcement respectively into the first and second bumper mounting receptacles, wherein at least a portion of the projections formed in the first and second end cap bumper reinforcements is positioned within the portion of the second bumper mounting receptacle positioned within the first bumper mounting receptacle.

16. The method of claim 15, wherein inserting the projection formed in the first end cap bumper reinforcement and the projection formed in the second end cap bumper reinforcement into the respective second bumper mounting receptacles occurs prior to inserting the respective projections formed in the center bumper reinforcement into each of the first bumper mounting receptacles.

17. The method of claim 15, further comprising attaching a front fascia to the center bumper reinforcement, and further comprising coupling a trim portion to the front fascia, and attaching the front fascia to the center bumper reinforcement prior to inserting the respective projections formed in the center bumper reinforcement into each of the first bumper mounting receptacles.

18. The method of claim 15, further comprising attaching a first end cap fascia to the first end cap bumper reinforcement and a second end cap fascia to the second end cap bumper reinforcement.

19. The method of claim 18, wherein attaching the first end cap fascia to the first end cap bumper reinforcement and the second end cap fascia to the second end cap bumper reinforcement occurs prior to inserting the respective projections formed in the center bumper reinforcement into each of the first bumper mounting receptacles.

20. The method of claim 15, wherein the interlocking bumper is mounted to the frame rails without the use of pegs.

21. A bumper for mounting to frame rails of a vehicle comprising:
respective first bumper elements comprising a first nesting portion coupled to the frame rails and defining a first longitudinal axis, the first bumper elements being offset from the frame rails;
a second bumper element comprising respective second nesting portions configured to nestably engage the first nesting portions to couple the second bumper element to the frame rails, each second nesting portion defining a second longitudinal axis; and
a third bumper element comprising respective third nesting portions configured to nestably engage the first and second nesting portions to couple the third bumper element to the second bumper element and the frame rails, each third nesting portion defining a third longitudinal axis;
wherein when the first nesting portions are nestably engaged with the second nesting portions and the third nesting portions are nestably engaged with the first and second nesting portions, the first, second and third longitudinal axes of respective first, second and third nesting portions are substantially co-axially aligned.

22. A method of mounting a bumper to frame rails of a vehicle comprising:
coupling respective first bumper elements comprising a first nesting portion to the frame rails, wherein the first bumper elements are offset from the frame rails and the first nesting portions each comprise a first object receiving recess;
nestably engaging second nesting portions of a second bumper element with the first nesting portions of the respective first bumper elements to couple the second bumper element to the frame rails, wherein the second nesting portions are positioned within the first object receiving recesses and each comprise a second object receiving recess at least partially positioned within a respective first object receiving recess when the second nesting portions are nestably engaged with the first nesting portions; and
nestably engaging third nesting portions of a third bumper element with the second nesting portions of the second bumper element and the first nesting portions of the respective first bumper elements to couple the third bumper element to the second bumper element and the frame rails, wherein the third nesting portions are positioned within at least the portions of the second object receiving recesses positioned within the first object receiving recesses such that each first object receiving recess simultaneously surrounds a respective second nesting portion, a respective second object receiving recess and a respective third nesting portion when the third nesting portions are nestably engaged with the first and second nesting portions.

23. A vehicle comprising:
an elongate bumper comprising plural preassembled bumper components;
first and second frame rails;
a first set of bumper mounting couplers comprising a first rearward receptacle, a first rearward projection defining a first forward receptacle, and a first forward projection;
a second set of bumper mounting couplers comprising a second rearward receptacle, a second rearward projection defining a second forward receptacle, and a second forward projection;
the first rearward projection being coupled to a first component of the plural preassembled components, the first forward projection being coupled to a second component of the plural preassembled components, and the first rearward receptacle being coupled to the first frame rail;
the second rearward projection being coupled to the first component of the plural preassembled components at a location transversely spaced from the first rearward projection, the second forward projection being coupled to the second component, and the second rearward receptacle being coupled to the second frame rail; and
the first rearward receptacle, first rearward projection, first forward receptacle, and first forward projection of the first set of bumper mounting couplers interfitting with one another and being secured together such that the first rearward projection and first forward receptacle are positioned within the first rearward receptacle and the first forward projection is positioned within the first forward receptacle and the first rearward receptacle, and the second rearward receptacle, second rearward projection, second forward receptacle, and second forward projection of the second set of bumper mounting couplers interfitting with one another and being secured together such that the second rearward projection and second forward receptacle are positioned within the second rearward receptacle and the second forward projection is positioned within the second forward receptacle and the second rearward receptacle to couple the bumper to the first and second frame rails.

24. An interlocking bumper for mounting to frame rails of a vehicle comprising:
a respective first bumper projection coupled to each frame rail;
a center bumper reinforcement comprising projections, wherein each projection defines a first bumper mounting receptacle configured to receive one of the first bumper projections; and
first and second end cap bumper reinforcements each comprising a second bumper mounting receptacle configured to receive the projections of the center bumper reinforcement.

25. An interlocking bumper for mounting to frame rails of a vehicle comprising:
respective spaced apart first bumper mounting receptacles coupled to the frame rails, the first bumper mounting receptacles each comprising a base and at least one side wall the base and at least one side wall defining a first projection receiving pocket;
a center bumper reinforcement comprising spaced apart second bumper mounting receptacles each comprising a base and at least one side wall, the base and at least one side wall of each second bumper mounting receptacle defining a first projection and a second projection receiving pocket, wherein each first projection is insertable into a respective first projection receiving pocket and nestably engageable with a respective first bumper mounting receptacle, and wherein the base and at least a portion of the at least one side wall of each second bumper mounting receptacle and second projection receiving pocket is positionable within a respective first projection receiving pocket; and
an end cap bumper reinforcement comprising spaced apart third bumper mounting receptacles each comprising a base and at least one side wall, the base and at least one side wall of each third bumper mounting receptacle defining a second projection, wherein each second projection is insertable into a respective second projection receiving pocket and nestably engageable with a respective second bumper mounting receptacle, wherein the base and at least a portion of the at least one side wall of each third bumper mounting receptacle is positionable within a respective first and second projection receiving pocket;

wherein the bumper is mountable to the frame rails by extending at least one fastener through the bases of the respective first, second and third bumper mounting receptacles in a direction substantially parallel to the frame rails, and wherein when mounted, the bases of the respective first, second and third bumper mounting receptacles are adjacent one another and the at least one side walls of the respective first, second and third bumper mounting receptacles are adjacent one another.

26. The interlocking bumper of claim 25, wherein the at least one side wall of each first bumper mounting receptacle surrounds the first projection and second projection receiving pocket of a respective second bumper mounting receptacle and the second projection of a respective third bumper mounting receptacle.

* * * * *

UNITED STATES PATENT AND TRADEMARK OFFICE
CERTIFICATE OF CORRECTION

| | |
|---|---|
| PATENT NO. | : 7,303,219 B2 |
| APPLICATION NO. | : 11/245777 |
| DATED | : December 4, 2007 |
| INVENTOR(S) | : Trabant et al. |

Page 1 of 1

It is certified that error appears in the above-identified patent and that said Letters Patent is hereby corrected as shown below:

In Column 12, line 47, "wall the base" should be --wall, the base--.

Signed and Sealed this

Third Day of March, 2009

JOHN DOLL
*Acting Director of the United States Patent and Trademark Office*